United States Patent [19]

Perry et al.

[11] Patent Number: 4,598,404
[45] Date of Patent: Jul. 1, 1986

[54] DATA FORMAT ARRANGEMENT FOR COMMUNICATION BETWEEN THE PERIPHERAL PROCESSORS OF A TELECOMMUNICATIONS SWITCHING NETWORK

[75] Inventors: Thomas J. Perry, Phoenix; Muhammad I. Khera, Glendale, both of Ariz.

[73] Assignee: GTE Automatic Electric Inc., Northlake, Ill.

[21] Appl. No.: 564,137

[22] Filed: Dec. 22, 1983

[51] Int. Cl.$^4$ ............................................. G06F 11/00
[52] U.S. Cl. ........................................ 371/49; 371/50
[58] Field of Search .......................... 371/49, 50, 51; 364/200, 900

[56] References Cited

U.S. PATENT DOCUMENTS

| | | | |
|---|---|---|---|
| 3,648,256 | 3/1972 | Paine | 371/49 |
| 3,711,829 | 1/1973 | Lubrano | 371/49 |
| 3,831,144 | 8/1974 | En | 371/50 |
| 3,909,782 | 9/1975 | Mazier | 371/49 |
| 3,914,741 | 10/1975 | Bonser | 371/49 |
| 4,092,522 | 5/1978 | Miller | 371/49 |
| 4,103,288 | 7/1978 | Westman | 371/49 |
| 4,155,070 | 5/1979 | Munter | 371/49 |
| 4,197,523 | 4/1980 | Philip et al. | 371/49 |
| 4,346,474 | 8/1982 | See | 371/49 |
| 4,433,388 | 2/1984 | Oosterbaan | 371/49 |

*Primary Examiner*—Michael R. Fleming
*Attorney, Agent, or Firm*—Anthony Miologos; Peter Xiarhos

[57] ABSTRACT

A formatted data message for conveying control information from the peripheral processor of one telecommunications switching system to the peripheral processor of at least one other telecommunications switching system is provided. The data message format comprises a first control work including a plurality of control bits, a data bit and a parity bit for the first control word and a plurality of data words, each data word including a parity bit. The data words contain control information to be conveyed to the receiving peripheral processor. A parity word is included which provides parity for an associated plurality of the preceding data and control words.

13 Claims, 4 Drawing Figures

DATA FORMAT ARRANGEMENT FOR COMMUNICATION BETWEEN THE PERIPHERAL PROCESSORS OF A TELECOMMUNICATIONS SWITCHING NETWORK

CROSS-REFERENCE TO RELATED APPLICATIONS

The present application is related to the following co-pending U.S. patent applications all having the same inventive entity and being assigned to the same assignee:

U.S. patent application Ser. No. 564,134, titled, "A Remote Data Link Controller;"

U.S. patent application Ser. No. 564,138, titled, "A Remote Data Link Controller Having Multiple Data Link Handling Capabilities;"

U.S. patent application Ser. No. 564,135, "A Remote Data Link Receive Data Reformatter;"

U.S. patent application Ser. No. 564,133, "A Remote Data Link Transmit Data Formatter;"

U.S. patent application Ser. No. 564,136, "A Remote Data Link Address Sequencer and a Memory Arrangement for Accessing and Storing Digital Data."

BACKGROUND OF THE INVENTION

The present invention relates generally to data transmission between the switching systems of a telecommunication switching network and more particularly to a digital data format arrangement for the exchange of control messages between the peripheral processors of each switching system.

In modern digital telecommunication switching systems a concept of network modularity has been designed allowing the interconnection of small switching systems remote to a larger host system. These remote switching systems have capacities to handle between a few hundred and a few thousand telephone subscribers. The remote switching systems are normally used in areas where the installation of a large switching system would be uneconomical.

A high speed digital data link typically interfaces the host switching system to the remote system through which large amounts of voice and control data are exchanged. The voice data normally comprises subscriber calls switched through either the host or the remote system. The control data may be status exchanges between the host and the remote, i.e. centralized administration, billing and maintenance, or the direct control of the operation of the remote by the host.

The control data exchanges are originated in the sending system peripheral processor transmitted over the high speed digital data link to the receiving system peripheral processor where the data is interpreted. In order to relieve each peripheral processor from the burden of controlling the data link a remote data link controller is implemented in each system which performs all tasks involved in the formatting, transmission and reception of the control data.

The remote data link controllers are connected to each other via digital spans. These digital spans may be T1, T2 or T1C, T3 carriers using DS1, DS2 or DS1C, DS3 data formats, respectively. These digital spans transmit data at high speeds serially at a rate of approximately 1.5–45 megabits per second.

Each data link, in the absence of transmission errors, has the capability of handling upwards of 400 messages per second in each direction. Consequently, the data exchanged should have a format providing excellent error immunity, throughput and enhanced processing performance.

Accordingly, it is the object of the present invention to provide an efficient digital data format arrangement for the exchange of control messages between the peripheral processors of a telecommunications switching network.

SUMMARY OF THE INVENTION

In accomplishing the object of the present invention a data message format for conveying control information from a peripheral processor of one telecommunications switching system to a peripheral processor of at least one other telecommunications switching system is provided. Each telecommunications switching system is connected to the other by a digital data link and each includes a digital link controller connected between the peripheral processor and the digital data link.

The data message format of the present invention is comprised of at least one control word including a plurality of control bits, a data bit and a control word parity bit. The data message further includes a plurality of data words, each data word comprising a plurality of data bits and a data word parity bit for each data word.

Finally, a parity word is included having a plurality of parity bits with each parity bit providing parity for an associated plurality of bits of the preceding plurality of data and control words. The parity word also includes a parity bit for the parity word.

DESCRIPTION OF THE PREFERRED EMBODIMENT

Figure 1:
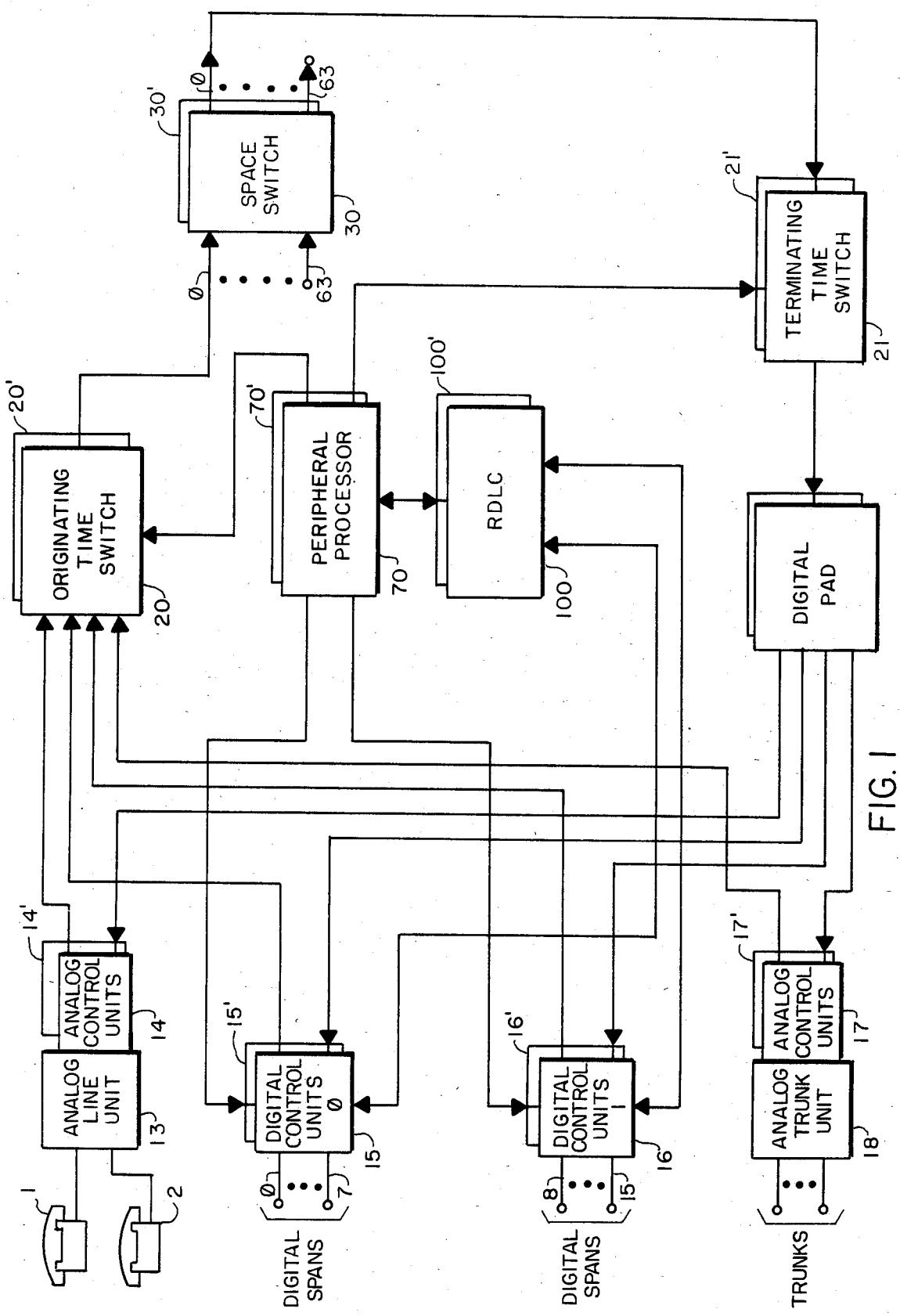
FIG. 1 is a block diagram of a telecommunications switching system including a remote data link controller.

Referring to FIG. 1, a time-space-time digital switching system along with the corresponding common control is shown. Telephone subscribers, such as subscribers 1 and 2, are shown connected to analog line unit 13. Analog line unit 13 is connected to both copies of the analog control unit 14 and 14'. Originating time switches 20 and 20' are connected to a duplex pair of space switch units 30 and 30' which are in turn connected to a duplex pair of terminating time switches 21 and 21'. Terminating time switches 21 and 21' are connected to analog control units 14 and 14' and ultimately to the telephone subscribers 1 and 2 via analog line circuit 13. Digital control units 15, 15' and 16, 16' connect the digital spans to the switching system. Digital span equipment may be implemented using a model 9004 T1 digital span, manufactured by GTE Lenkurt, Inc. Similarly, analog trunk unit 18 connects trunk circuits to the digital switching system via analog control units 17 and 17'.

A peripheral processor CPU 70 controls the digital switching system and digital and analog control units.

Analog line unit 13 and a duplex pair of analog control units 14 and 14' interface to telephone subscribers directly. A duplicate pair of digital control units 15, 15' and 16, 16' control the incoming PCM data from the digital spans. Similarly, the analog trunk unit 16 and a duplex pair of analog control units 17 and 17' interface to trunk circuits. The analog and digital control units are each duplicated for reliability purposes.

The network of FIG. 1 also includes a duplicated REMOTE DATA LINK CONTROLLER (RDLC) 100, 100' which provides formatting and control of data transmitted and received between the peripheral processors of two or more switching systems. The RDLC can provide up to 16, 64 kilobits per second data links arranged for full duplex operation and is configured so that it can provide one full duplex data link for each of the 16 T1 spans. RDLC 100 can operate together with one or two digital control units (DCU), with each DCU capable of providing up to eight T1 carrier facilities.

Figure 2:
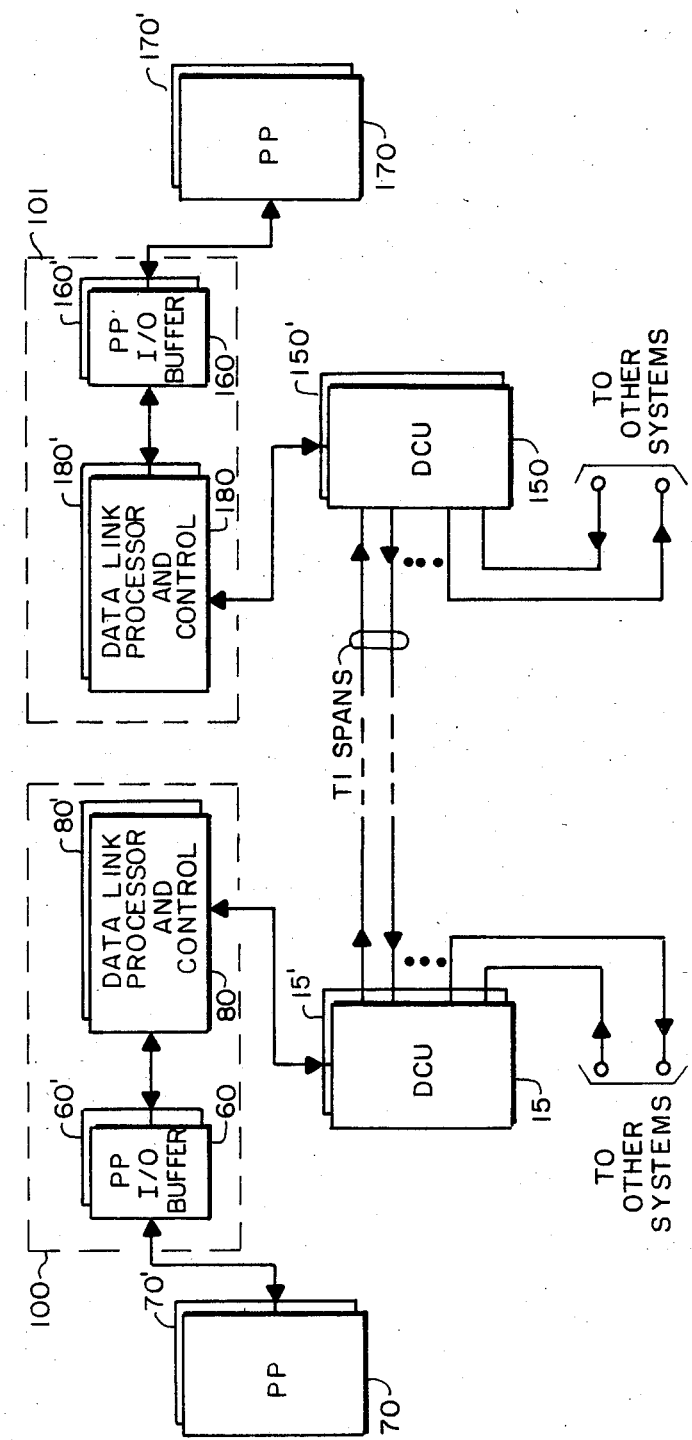
FIG. 2 is a block diagram showing the interconnection of the two telecommunications switching systems via a T1 span.

Turning now to FIG. 2, two distantly located switching systems each including an RDLC is shown. A first system includes a duplicated peripheral processor (PP) 70, 70' connected to a duplicated PP I/O buffer 60 and 60'. Each PP I/O buffer 60 and 60' is in turn connected to a duplicated data link processor and control unit 80 and 80' and each data link processor and control unit 80 and 80', to an associated digital control unit (DCU) 15 and 15'.

DCU 150 and 150' of the second switching system is connected to DCU 15 and 15' via a T1 span signal pair. DCU 150 and 150' is connected to an associated data link processor and control 180 and 180' and via PP I/O buffer 160 and 160' to PP 170 and 170'.

For ease of explanation PP 70 will be the transmitting processor and PP 170 the receiving processor. It should be understood that either RDLC 100 or 101 is capable of transmitting as well as receiving.

Prior to examining the detailed operation of the RDLC, it is helpful to understand the format and protocol of the messages which are transmitted and received by the RDLC. Each message consists of eight, 8-bit bytes of data for a total of 64 bits. The peripheral processor I/O buffer provides four transmit message buffers and four receive message buffers for each of the 16 possible data links.

Normally, peripheral processor 70, 70' software, writes a message into a transmit message buffer of PP I/O buffer 60 and 60' associated with a particular data link and then issues a transmit command to data link processor and control 80 and 80'. The data link processor and control 80 and 80' responds by taking the message out of the transmit message buffer and formatting the data so that it can be transmitted over a T1 carrier. The data link processor and control 80, 80' then transmits the message to the distant end of the data link through DCU 15, 15' and the T1 span.

The message is received at the receiving DCU 150, 150' and is transferred to the data link processor and control 180 and 180' where it is reformatted. The received data message is then placed into an appropriate receive message buffer in the PP I/O buffer 160 and 160'. Data link processor and control 180 and 180' then causes an interrupt, alerting PP 170 and 170' to the fact that a message has been received. It should be noted that under normal conditions the RDLC functions in a duplicated configuration, that is, it matches all outgoing signals performed in the DCUs. With this arrangement there is one RDLC circuit for each of the two copies of the DCUs.

Figure 3:
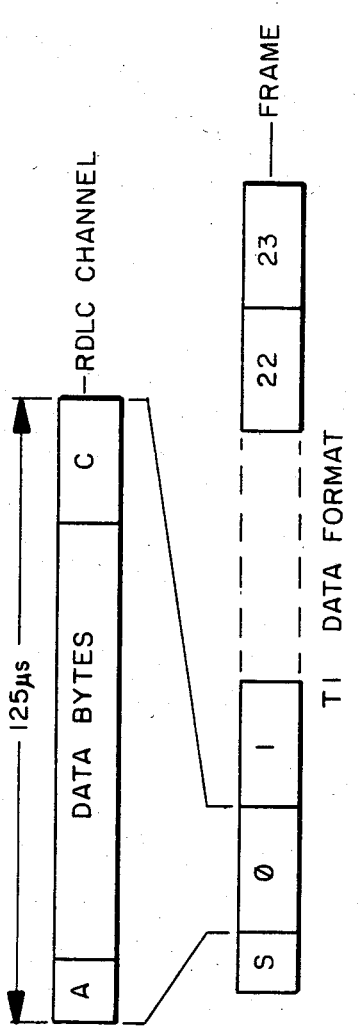
FIG. 3 is a bit map of a channel, and a frame of a T1 digital span.
Figure 4:
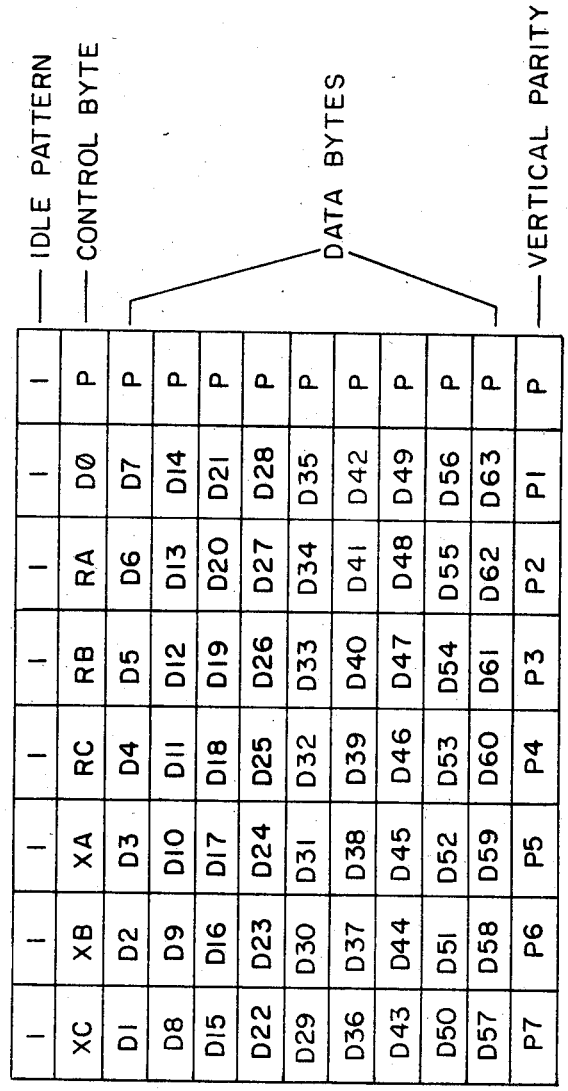
FIG. 4 is a bit map representation of the data format of the present invention.

The nature of a T1 data and its format is shown in FIG. 3. Normally, each T1 span transmits and receives voice samples organized together into a frame. Each frame includes 24 voice samples with each voice sample associated with one channel of voice (or data). The channels are numbered 0–23. Normally, the RDLC will insert its data bytes in channel 0. The S bit carries a periodic pattern which, when detected, is used to identify the beginning of each frame of data.

Turning now to FIG. 3, a bit map representing the complete data format for one message is shown. The data format is byte oriented with one 8-bit byte being transmitted during each T1 data frame for each data link.

When the link is idle and not transmitting the transmitter sends idle patterns consisting of all ones. The beginning of a message is indicated by sending a control byte containing one or more zeros which may contain information conveying the sequence number of messages transmitted or received and/or acknowledgements between the RDLCs.

As can be seen in FIG. 3 only six control bits are used (XC, XB, XA, RC, RB, RA) in the control byte. The control bits have the following significance:

XC bit (bit 7) this bit is reset to indicate an acknowledgment message. If both the XC and RC bits are reset, the message is interpreted as a reset message.

XA, XB bits (bits 5 and 6) contain the sequence number associated with the transmitted message, i.e. which of the eight bytes is being transmitted. If the XC bit is reset, the sequence number has no significance and is ignored by the receiver.

RC bit (bit 4) when set, this bit indicates that bits RA and RB contain the sequence number of a message that is being acknowledged by this message. It should be noted that a single message may both contain data and an acknowledgment of a previous message.

RA, RB bits (bits 2 and 3) these bits may contain a sequence number (if RE is set) or if both XC and RC are reset, these bits indicate which of the associated PP copies should be forced into an active state. In this case the RA and RB bits indicate the function to be performed as follows:

| RA | RB | |
|----|----|---|
| 0 | 0 | Remove previous PP force |
| 0 | 1 | Force Copy 1 PP |
| 1 | 0 | Force Copy 0 PP |
| 1 | 1 | Reset and restore previous PP force |

The first data bit to be transmitted is inserted in the bit 1 position of the control byte. The control byte further includes an odd parity bit in bit position 0.

The next nine bytes contain the remaining 63 bits of data, each byte containing seven bits of data plus an odd parity bit. The final message byte contains seven vertical parity bits plus an odd parity bit for the vertical parity byte. Each vertical parity bit provides even parity for ten of the preceding bits, i.e. P1 for bit 1 in each of the preceding ten bytes, P2 for bit 2, P3 for bit 3, etc. The next byte will contain idle pattern.

It should be noted that the idle pattern is unique in that it has even parity. This makes it easy for the receiver to synchronize with the incoming data stream and greatly reduces the chance that a receiver would accept an incorrect message because of improper synchronization.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A data message formatter for conveying control information from a peripheral processor of one telecommunication switching system to a peripheral processor of at least one other telecommunication switching system, each telecommunication switching system connected to the other by a digital data link and each including a digital link controller connected between said peripheral processor and said digital data link, each data link controller arranged to receive from its associated peripheral processor said control information, where said control information is formatted into said data message and transmitted over said data link to the data link controller of another peripheral processor, said data message format comprising:

at least one control word having eight information bits said control word including a control field having six control bits, said control word further including a data bit and a control word parity bit, said control word arranged to convey to a receiving data link controller data link status information;

a plurality of data words, each data word is comprised of seven data bits, and a data word parity bit, and said plurality of data words contain 63 data bits in nine data words, said data words arranged to pass instructions and status information to a receiving peripheral processor; and a parity word including a plurality of parity bits, each parity bit providing parity for an associated plurality of said preceding plurality of data words and control words, said parity word further including a parity word parity bit.

2. A data message format as claimed in claim 1, wherein: said parity word comprises seven even parity bits each parity bit providing vertical parity for all preceding data and control bits in the associated bit position.

3. A data message format as claimed in claim 1, wherein: said control word parity bit provides odd horizontal parity for said control word.

4. A data message format as claimed in claim 1, wherein: said data word parity bit provides odd horizontal parity for each data word.

5. In a telecommunication switching network having a host telecommunication switching system connected to a remote telecommunication switching system by a digital data link, said host telecommunication switching system including at least one data link controller connected between said digital data link and said peripheral processor, and said remote telecommunication switching system including a duplicated peripheral processor and a duplicated data link controller connected between said digital data link and each of said peripheral processors, said duplicated peripheral processors running synchronously with one processor active and the other in a stand-by status, said host data link controller arranged to receive from said host peripheral processor control instructions and information where said control instructions and information is formatted into a data message format for conveying control instructions and information from said host telecommunication switching system to said remote telecommunication switching system, said data message format comprising:

a control byte including a control field comprising six control bits conveying sequence, acknowledgement and reset instructions to said remote data link controllers from said host peripheral processor, said control byte further including a first data bit of a control data message, and a parity bit for said control byte;

nine data bytes containing the remainder of said control data message, each data byte containing seven data bits and a parity bit for said data byte, said data bits conveying control information and status for the active remote peripheral processor from the host peripheral processor; and a parity byte, including a plurality of parity bits, each parity bit providing vertical parity for an associated plurality of preceding data bits and control bits, said parity byte further including a parity bit for said parity byte.

6. A control message format as claimed in claim 5, wherein: said control field includes a transmit control bit and a plurality of transmit sequence control bits and said transmit control bit is reset indicating an acknowledgement message and said transmit sequence control bits have no significance and are ignored by said data link controller.

7. A control message format as claimed in claim 6, wherein: said control field includes a receive control bit and a plurality of receive sequence control bits and said plurality of receive sequence control bits contain the sequence number of the control data message acknowledged when said receive control bit is set.

8. A control message format as claimed in claim 7, wherein: said control data message contains reset instructions to said data link controller when said transmit control bit and said receive control bit are reset.

9. A control message format as claimed in claim 8, wherein: said plurality of receive sequence control bits indicate which peripheral processor of said duplicated peripheral processors should be forced into an active state when the transmit sequence control bit and said receive control bit are reset.

10. A control message format as claimed in claim 5, wherein: said plurality of transmit sequence control bits contain a transmit sequence number of a control data message when said transmit control bit is set.

11. A control message format as claimed in claim 5, wherein: said control byte parity bit provides odd horizontal parity for said control byte.

12. A control message format as claimed in claim 5, wherein: said data byte parity bit provides odd horizontal parity for each data byte.

13. A control message format as claimed in claim 5, wherein: said parity byte comprises seven even parity bits, each parity bit providing vertical parity for all the data and control bits in the associated bit position.

* * * * *